US00RE47015E

(19) United States
(12) Reissued Patent
Roosch

(10) Patent Number: US RE47,015 E
(45) Date of Reissued Patent: Aug. 28, 2018

(54) DOCUMENT HANDLING APPARATUS

(71) Applicant: Glory Global Solutions (International) Limited, Basingstoke (GB)

(72) Inventor: Pieter Rens Roosch, Murten (CH)

(73) Assignee: Glory Global Solutions (International) Limited, Basingstoke (GB)

(21) Appl. No.: 15/136,939

(22) Filed: Apr. 24, 2016

Related U.S. Patent Documents

Reissue of:
(64) Patent No.: 8,708,127
Issued: Apr. 29, 2014
Appl. No.: 13/258,233
PCT Filed: Mar. 23, 2009
PCT No.: PCT/EP2009/053398
§ 371 (c)(1),
(2) Date: Sep. 21, 2011
PCT Pub. No.: WO2010/108536
PCT Pub. Date: Sep. 30, 2010

(51) Int. Cl.
*G07F 7/04* (2006.01)
*G07D 11/00* (2006.01)

(52) U.S. Cl.
CPC ..... *G07D 11/0081* (2013.01); *G07D 11/0057* (2013.01)

(58) Field of Classification Search
CPC ..... G07D 11/0081; G07D 11/0057
USPC ..... 194/206, 350; 109/58
See application file for complete search history.

(56) References Cited

U.S. PATENT DOCUMENTS 4,517,451 A * 5/1985 Kokubo et al. ..... 235/379
4,549,661 A * 10/1985 Morishita et al. ..... 209/534
4,602,332 A * 7/1986 Hirose et al. ..... 705/43
4,905,840 A * 3/1990 Yuge et al. ..... 209/534
5,251,738 A * 10/1993 Dabrowski ..... 194/206
5,679,835 A 10/1997 Inden et al.
6,484,938 B1 * 11/2002 Shepherd et al. ..... 235/381
(Continued)

FOREIGN PATENT DOCUMENTS

EP 0 735 513 A1 * 3/1996 ..... G07D 11/00
EP 0735513 A1 10/1996
(Continued)

*Primary Examiner* — William Doerrler
(74) *Attorney, Agent, or Firm* — Renner, Kenner, Greive, Bobak, Taylor & Weber

(57) ABSTRACT

A document handling apparatus (10) is disclosed. The apparatus (10) comprises a safe (20) housing a storage assembly (30), a note handling module [(30)] (*40*) mounted on top of the safe (20) and a door cover (60) which conceals a safe door (22) providing access to the interior of the safe. The note handling module [(30)] (*40*) has an input module (41), a NHM transport (42) for conveying documents, an output module (46), a document analysis assembly (43) and a first diverter (44) controlled by a main control unit. The door cover (60) further conceals a cassette module (50) located between the door cover (60) and the [door] safe *door* (22) and which houses a removable cassette (110) for storing documents.

31 Claims, 6 Drawing Sheets

(56) References Cited

U.S. PATENT DOCUMENTS

| | | | | |
|---|---|---|---|---|
| 7,658,320 | B1 * | 2/2010 | Lute | G07D 11/0081 235/375 |
| 7,828,133 | B2 * | 11/2010 | Kadowaki | G07D 11/0081 194/206 |
| 2001/0015309 | A1 * | 8/2001 | Ikuta | 194/206 |
| 2004/0134839 | A1 * | 7/2004 | Kobayashi et al. | 209/534 |
| 2005/0040005 | A1 * | 2/2005 | Dobbins | G07D 11/0006 194/206 |
| 2007/0034683 | A1 | 2/2007 | Eastman et al. | |
| 2010/0125515 | A1 * | 5/2010 | Aso et al. | 705/35 |

FOREIGN PATENT DOCUMENTS

| | | | | |
|---|---|---|---|---|
| EP | 1055793 | A2 | 11/2000 | |
| EP | 1130551 | A2 | 9/2001 | |
| RU | 2297668 | C2 | 1/2006 | |
| WO | 2004036386 | A2 | 4/2004 | |
| WO | 2008047094 | A2 | 4/2008 | |
| WO | WO 2008/047094 | A2 * | 4/2008 | B65H 1/00 |
| WO | WO2008047094 | * | 4/2008 | |

* cited by examiner

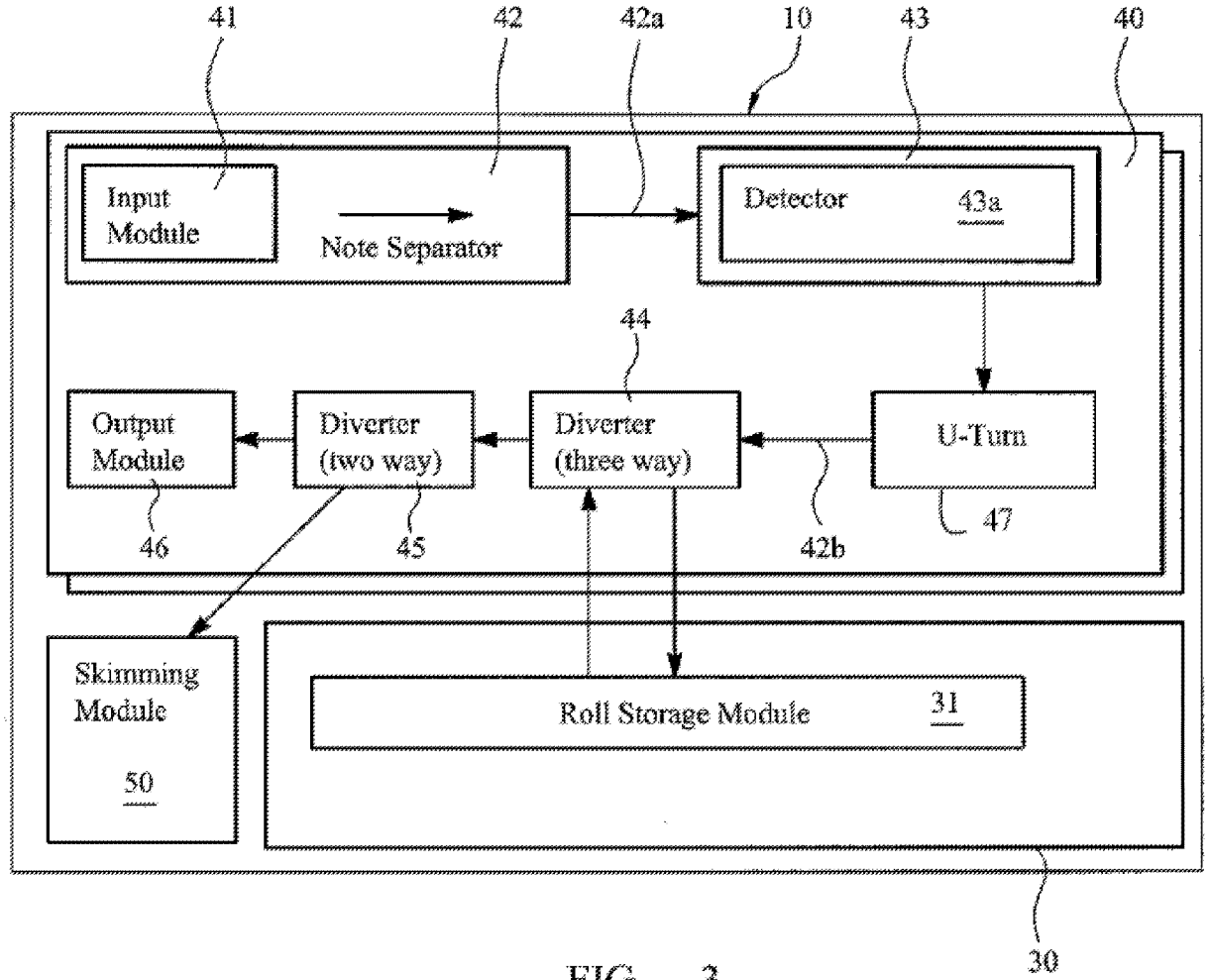
FIG. 3
(Amended)

FIG. 4
(Amended)
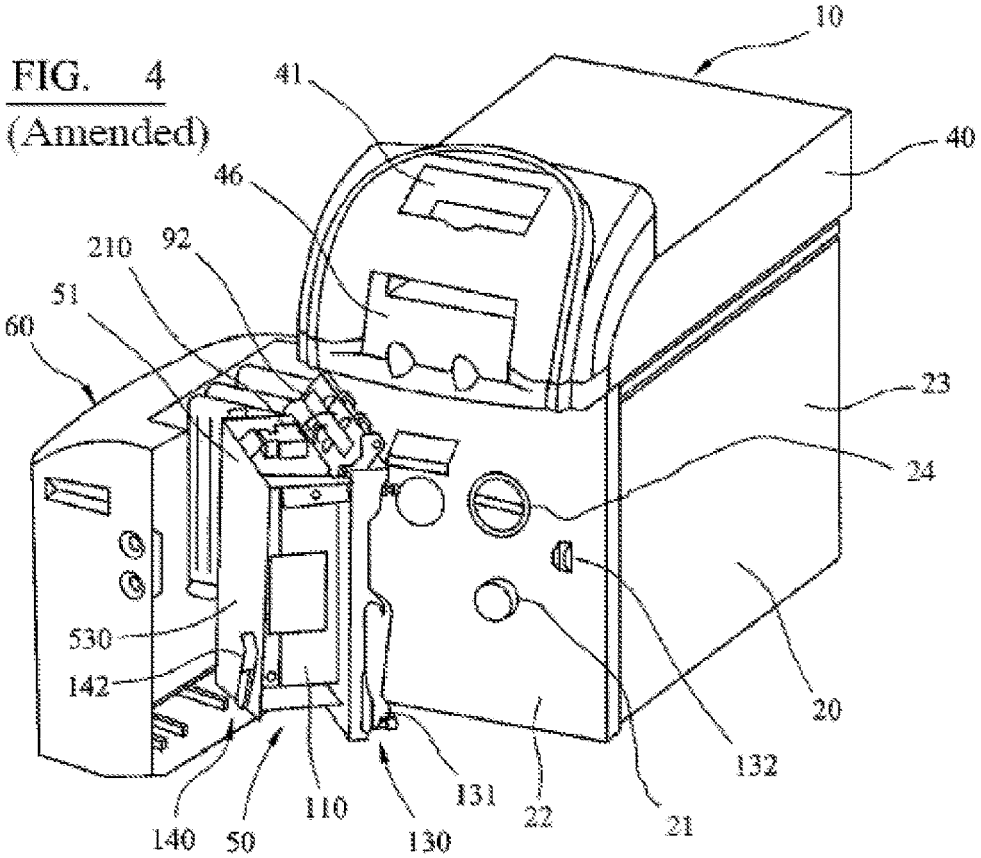
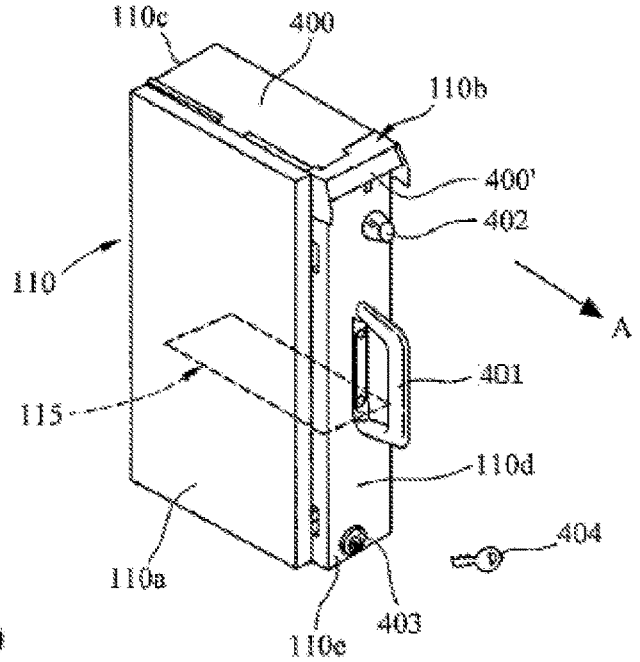
FIG. 6
(Amended)

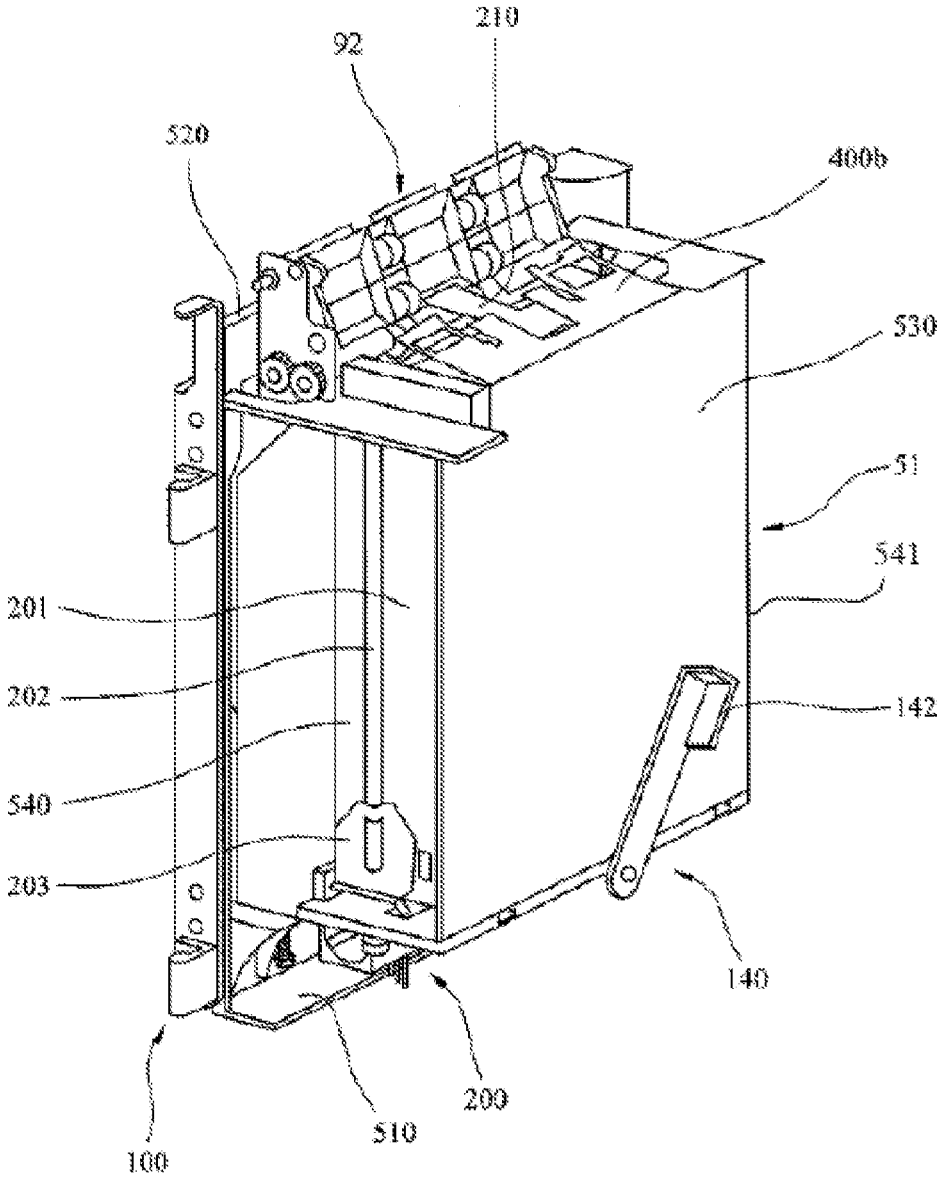
FIG. 5
(Amended)

DOCUMENT HANDLING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

The present invention relates to a document handling apparatus and more particularly to an apparatus for receiving, storing and dispensing documents, such as banknotes, from storage to a user.

WO 2008/047094, for example, describes such a multi-functional handling apparatus which comprises a vault or a safe housing a storage assembly and a note handling module mounted on top of the safe. The storage assembly, in this example, consists of a number of roll storage modules (RSMs) in which banknotes can be stored. The note handling comprises four components: an input module, a secure document analysis (SDA) assembly, a horizontal transport section and an output or stacker module. The front of the safe is provided with a moulding door cover which conceals a safe door providing access to the interior of the safe.

It has been found that such handling [apparatus] *apparatuses* need higher capacities on roll storage modules in order to adapt their uses to the business trend. However, in order to avoid increasing the size of the apparatus or the number of roll storage modules, it is known to use a cassette module offering an added space to empty the storage module when the number of banknotes contained in said storage modules of a given denomination or value, exceeds a predetermined number. Such a cassette module is, for example, disclosed in EP0735513 B1 which [shown] *shows* a handling apparatus, similar to the apparatus above described, comprising a pre-storage module and a cassette module having a collecting cassette used for receiving banknotes from the storage modules.

It is therefore an object of the present invention to improve a document handling apparatus which is further able to conveniently output documents or banknotes in bulk within a cassette module with a minimum increase of the size of the apparatus.

According to a first aspect of the invention there is provided a document handling apparatus comprising a safe housing a storage assembly, a note handling module (*NHM*) mounted on top of the safe and a door cover which conceals a safe door providing access to the interior of the safe, the note handling module having an input module, an NHM transport for conveying documents, an output module, a document analysis assembly and a first diverter controlled by a main control unit, wherein the door cover further conceals a cassette module located between the door cover and the [door] safe *door* and which houses a removable cassette for storing documents.

The cassette module may be mounted on the safe door by a secure hinge arrangement.

The cassette module may comprise a vertical transport section which in use is associated with a horizontal transport path section located in the note handling module.

Preferably, the output module comprises stacker wheels and the horizontal transport path section is located underneath the said stacker wheels.

Also preferably, the note handling module comprises a second diverter which when in a first position enables documents to be fed to the output module, and which when in a second position enables documents either earlier stored in the storage assembly or placed in the input module to be dispensed to the cassette in response respectively to a command entered from a user or to the detection via the document analysis assembly of pre-defined banknotes.

The second diverter may be located at a leading edge of the horizontal transport path section.

The cassette module may comprise a paddle drive mechanism arranged, in use, to drive up and down along the length of the cassette a packer plate located inside the cassette and a note stack level control for determining and controlling, in use, the position of the packer plate.

The cassette module may further comprise a lift mechanism which when in a first position enables a cassette to be loaded or unloaded from the cassette module, and which when in a second position enables documents to be fed to the cassette.

The cassette module may comprise [a] pivotally mounted note guides arranged in such a way that when the cassette is in its second position, the note guides reach into the cassette.

According to a second aspect of the invention there is provided a method of outputting documents in bulk to a removable cassette having a packer plate located inside the cassette and using a *document* handling apparatus [document] according to the first aspect of the present invention, which is controlled by a main control unit, comprising the steps of: inserting and locking the cassette within the cassette module and controlling the NHM transport and skimming transport *path* of the apparatus, the first and second diverter in such a way that documents either earlier stored in the storage assembly or placed in the input module to be dispensed to the cassette in response respectively to a command entered from a user sent to the MCU or to the detection of pre-defined banknotes.

The command entered from a user is preferably either a confirmation command entered in response to the detection that the capacity of the storage module is reaching its limit or a withdrawal command to dispense the document within the cassette.

The method may further comprise upon detection that the cassette is full or has reached a pre-determined value defined by the user, a command to stop dispensing documents to the cassette is sent to the MCU.

The invention will now be described by way of example with reference to the accompanying drawings of which:—

FIG. 3 is a schematic overview of the modules contained within the apparatus of FIG. 1;

FIG. 4 is a perspective view of the apparatus of FIG. 1 showing a door cover and a cassette module, according to the present invention, in their open position;

FIG. 5 is a perspective view of the cassette module;

FIG. 6 is a perspective view of a removable cassette adapted to be loaded within the cassette module of the apparatus of FIG. 1;

Figure 1:
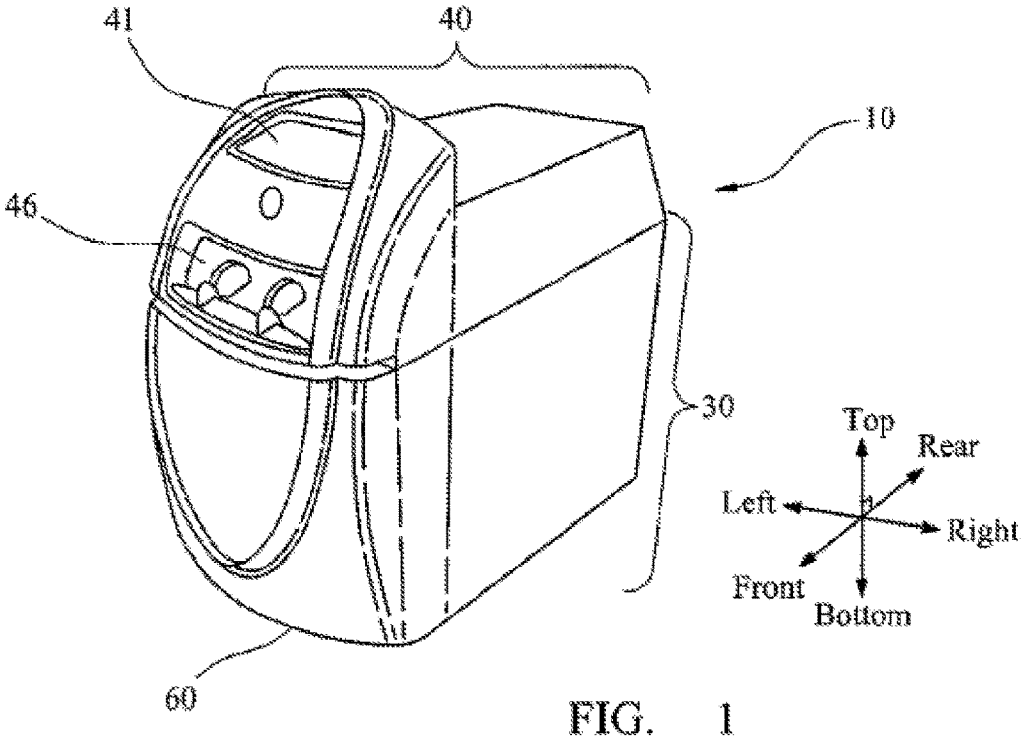
FIG. 1 is a perspective view of a document handling apparatus in accordance with the present invention.
Figure 2:
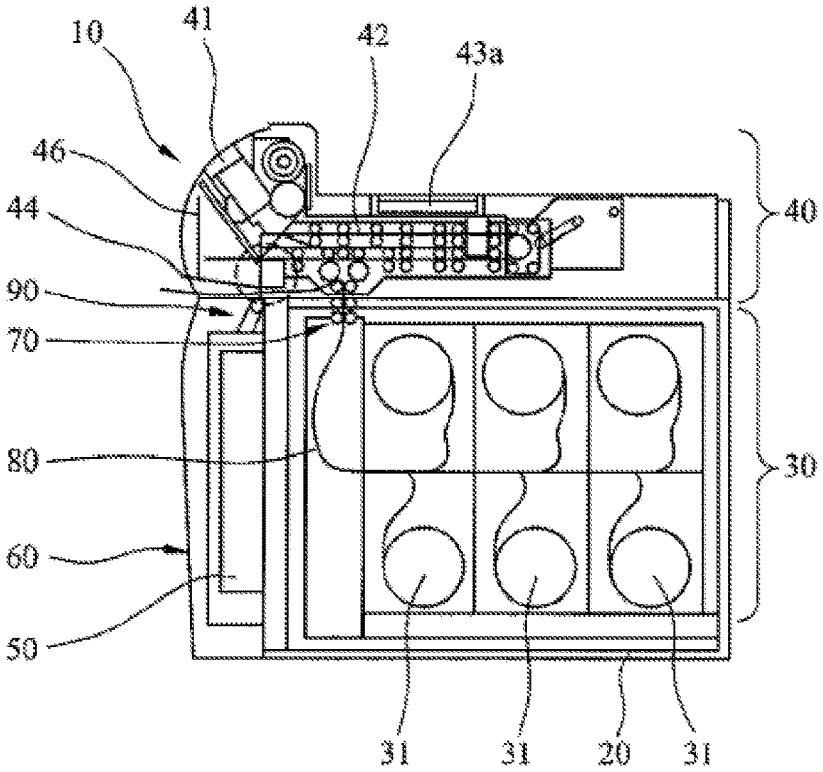
FIG. 2 is a schematic cross-section view of the apparatus of FIG. 1.

Referring to FIGS. 1 to 3, there is shown a multi-functional cash handling apparatus 10, according to the present invention, comprising a vault or a safe 20 housing a storage assembly 30, a note handling module (NHM) 40 mounted on top of the safe 20 and a skimming or cassette module 50.

The safe 20 conventionally comprises a body consisting of walls [21] *23* and a safe door 22 which provides access to the interior of the safe. The door 22 is mounted on the safe body by a secure hinge arrangement. The walls [21] *23* are typically made of steel and may be up to 40 mm in thickness. The door 22 comprises a lock [23] *21* which operates latches (not shown) to secure the door into the wall of the body, and a handle 24 for opening the door 22. The safe 20 is provided with a moulding door cover 60 which conceals the safe door [20] *22* providing access to the interior of the safe. The door cover 60 comprises a lock (not shown) to secure the door cover 60 to the safe 20.

The safe 20 also comprises an aperture [26] in its upper wall for transfer of notes between the storage assembly 30 and the note handling module 40.

The storage assembly 30 is slidably mounted into the safe 20 via a chassis (not shown). The storage assembly 30 comprises, in this example, a number of roll storage modules (RSMs) 31, in this example six RSMs, in which banknotes are stored.

The note handling module (NHM) 40, which in use, in this example, is located under a desk, advantageously comprises two main parts: an elongate frame that extends along the length of the safe and a moveable carriage which rests in use within the frame and [slide] *slides* out above the front of the safe, for access to the NHM, for example in the case of a note jam. Such a NHM 40 is more fully described in the patent application WO 2008/047094.

The NHM 40, as can best be shown in FIG. 3, comprises an input module 41, a NHM transport 42, a secure document analysis assembly (SDA) 43, a three way or first diverter 44, a two way or second diverter 45 and an output module 46.

The input module 41 is situated at the front of the NHM 40 above the output module 46. The input module 41 contains an input hopper which receives banknotes placed by a user and a series of roller mechanisms which feed the banknotes one by one into the NHM transport 42.

The NHM transport 42 comprises horizontal transport sections 42a to 42b. Each of these sections is typically a three belt transport system which receives notes and propels them forward. Hence after the input module 41 and as illustrated in FIG. 3, a first or upper transport section 42a conveys the notes through the SDA assembly 43 which comprises a detector module 43a so as to determine the properties of the note. The detector module 43a may include in a well-known manner a combination of the following: optical, magnetic, UV and IR system. Optionally, the detector module 43a may also have an ultrasound detector unit. A U-turn section 47 allows the note to move from the upper transport section 42a to a lower transport section [42c] *42b* by rotating the note by 180 degrees. The lower transport section 42b conveys the note towards the first diverter 44.

The first diverter 44 is more fully described in the patent application WO 2008/047094 and will only be described thereafter through its operation. The first diverter 44 allows three different note paths: from the input module 41 to a second diverter 45 or two way diverter; from the input module 41 to the roll storage modules 31 or from the roll storage modules 31 to the second diverter 45. A through safe transport 70 and a transport safe module 80 interact with the three way diverter 44 to convey the note to the appropriate RSM 31.

The final destination of the note after the first diverter 44 is controlled by a second diverter or two way diverter 45 including a guide member which is operable under the control of a control unit (not shown) to guide a banknote either from the first diverter 44 to the output module 46 or from the first diverter 44 to the cassette or skimming module 50 located outside the safe—between the safe door 22 and the door cover 60—via a skimming transport path 90.

The output or stacker module 46 comprises an output hopper [461] where notes are delivered to an operator, and a pair of stacker wheels 462. Each stacker wheel 462 conventionally comprises a solid plastic core and a plurality of arcuate protrusions defining veins therebetween. In use a banknote enters the veins at the top of the wheel 462 which is then rotated to turn the banknote and deposit it on guide plates 463 (FIG. [8] *7*) to support the growing banknote stack.

A banknote coming from the first diverter 44 and directed by the second diverter 45 to the cassette module 50 is conveyed via a horizontal transport section 91 situated underneath the output or stacker module 46 and which forms part of the skimming transport *path* 90.

With reference now to FIGS. 4 to 9, the skimming module or cassette module 50 comprises three components: a cassette structure 51 mounted on the safe door [60] *22* by a secure hinge arrangement 100, a vertical transport section 92, which forms all together with the horizontal transport section 91 located underneath the stacker wheels 46 the skimming transport path 90*, and a removable cassette 110 which in use is housed within the cassette structure 51*. The vertical transport section 92 is mounted at the upper part of the cassette structure 51[, and a removable cassette 110 which in use is housed within the cassette structure 51].

The vertical transport section 92 is conventionally a two belt and rollers transport system which is driven from a single motor.

Figure 7:
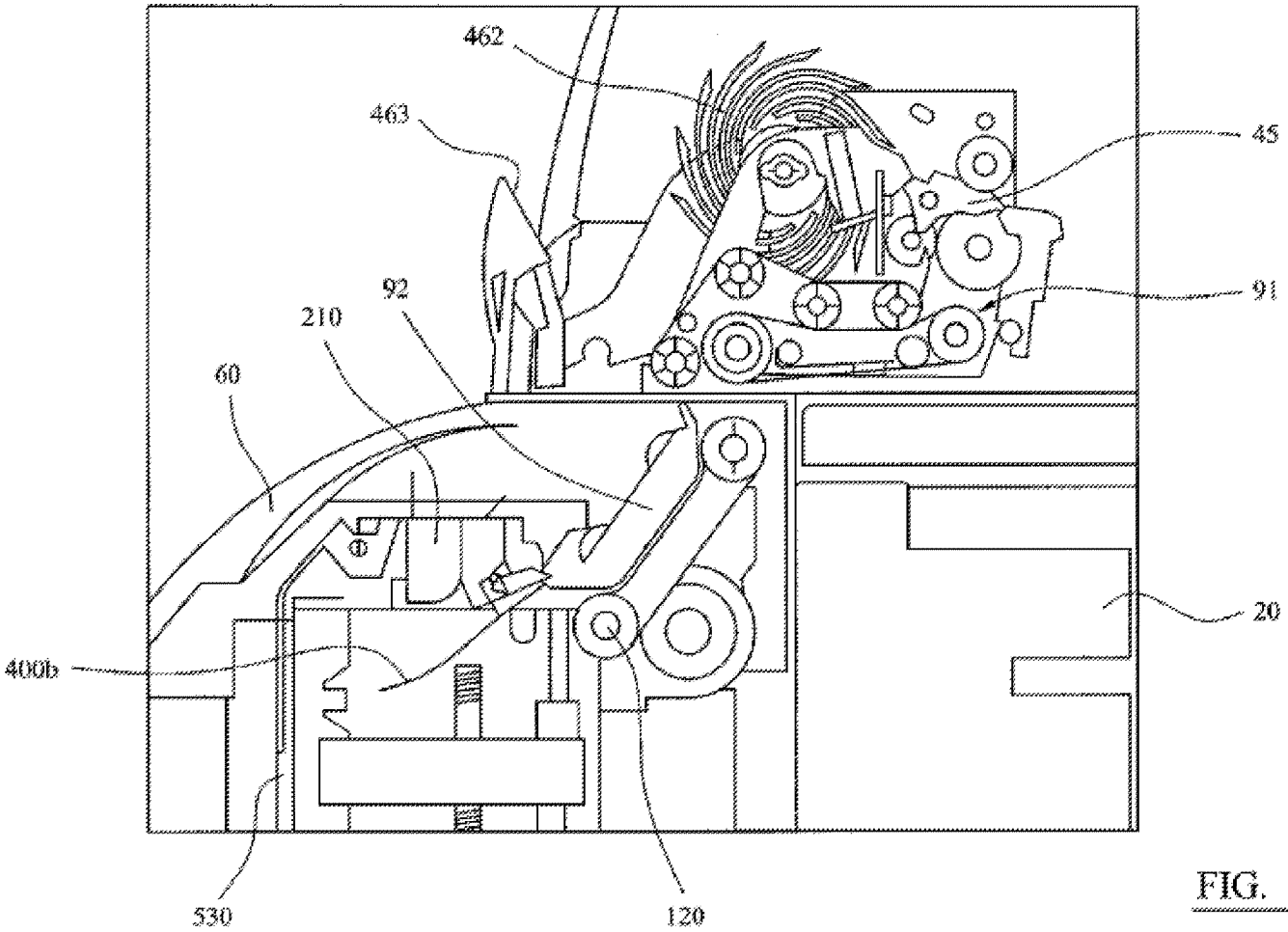
FIG. 7 is a partial cross section through an output module of the apparatus and the top part of the cassette module.
Figure 8:
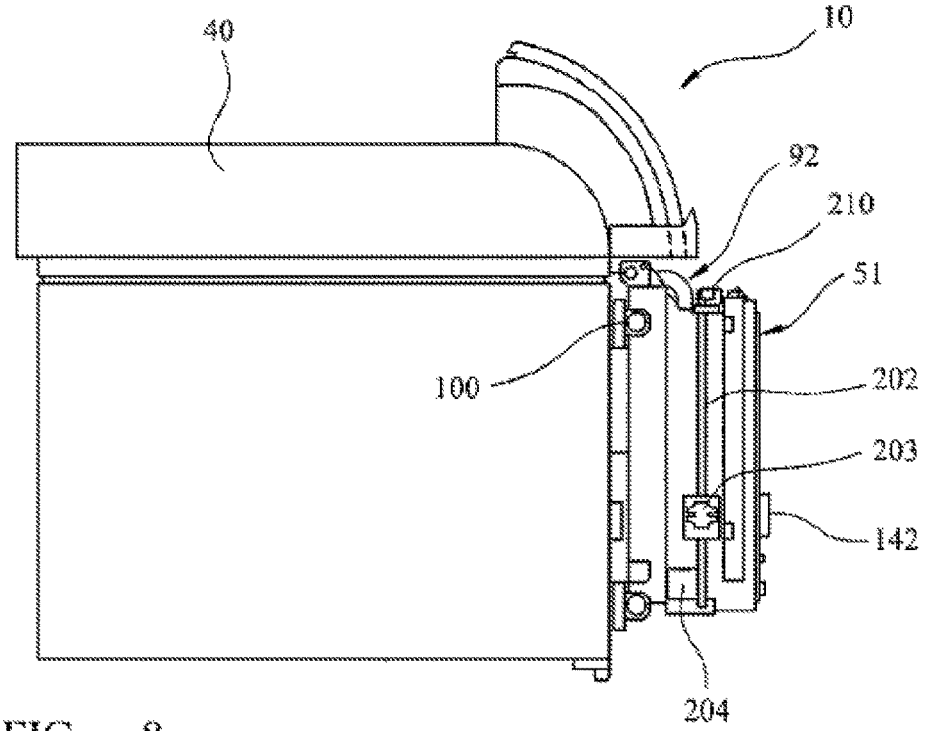
FIG. 8 is a left hand side view of the apparatus of FIG. 1, without a door cover.
Figure 9:
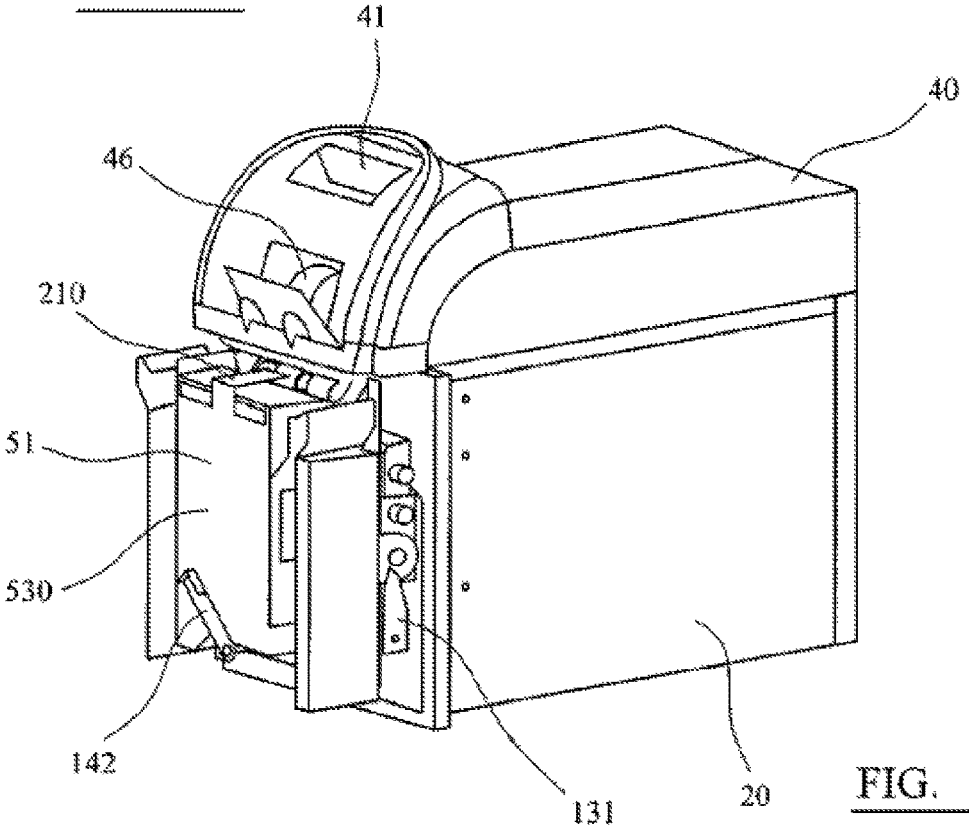
FIG. 9 is a perspective view of the apparatus without a door cover and in which the cassette is in its raised position.

Before entering the cassette 110, notes pass over brush assemblies ([note] *not* shown) which protrude through apertures provided in the vicinity of the trailing edge of the vertical transport section 92. Each brush assembly typically consists of a body which supports brush elements, the free extremities of which extend into the banknote path. Contact with the brushes helps to remove any static charge built up on the notes to improve formation of the stack. The trailing edge of the vertical transport section 92 is also provided with a pair of flapper wheels 120 (as shown in FIG. 7). In use, the flapper wheels 120 push the rear end part of the note causing the front end part of the note to collide with a front wall [111] *530* of the cassette 110 which will be described in detail thereafter. When the front end part of the note collides with the front wall [111] *530* of the cassette 110, the flapper wheels 120 further rotate pushing the rear end portion of the note downward and quickly depositing the note within the cassette 110.

The cassette structure 51, shown in FIG. 5, has a base wall 510, a rear wall 520, a front wall 530 and side walls 540, 541 which together define [550] a cavity which is sized to accommodate the removable cassette 110. The side wall 541 opposite the hinge arrangement 100 of the structure 51 is provided with an aperture permitting to slide or load the removable cassette 110 within the cassette structure 51. The cassette module 50 is further provided with a lock mechanism 130 to secure the cassette module 50 to the safe door 60. The lock mechanism 130 is, in this instance, an articulated lever 131 conformed to cooperate with a hook 132 arranged on the safe door 60.

The cassette structure 51 comprises a lift mechanism 140 to move the cassette 110 from a release or first position in which the cassette 110 rests on the base wall 510 to a skim position. The lift mechanism 140 comprises a lifting lever 142 [articulated] mounted in the front wall 530 of the cassette structure 51, which is linked to a cam profile (not shown) located behind the back wall 520.

The side wall 540 of the cassette structure adjacent to the hinge arrangement 100 is provided with a paddle drive mechanism 200 arranged to drive up and down along the length of the cassette 110 a packer plate 115 (see FIG. 6) located inside the cassette 110—as it will be described in detail thereafter—and a note stack level control 210 provided above the cassette structure 51. The stack level control 210 comprises, for example, an optical sensor fixed to a sensor mount which determines and controls the position of the plate 115 located inside the cassette 110.

An elongated aperture 201 is provided through the side wall 540 and extends in the direction between the base wall 540 and the top of the structure. A spindle 202 is arranged adjacent and parallel to the elongate aperture 201. A lifter carriage 203 with an internal screw thread is disposed on the spindle 202 which is provided with an external screw thread. The spindle 202 is coupled to a motor 204 via toothed cog (not shown). Activation of the motor 204 causes the spindle 202 to rotate and as a result the lifter carriage 203 moves up or down the spindle 202, depending on the direction of rotation of the spindle 202. The lifter carriage 203 has a protrusion which extends through the elongate aperture 201 and engages with the packer plate 115 of a cassette 110 loaded into the cassette structure 51.

The cassette module 50 is further provided with [a] note guides 400b pivotally mounted on the upper part of the front wall 530 and arranged in such a way that when the cassette 110 is lifted up the note guides 400b reach into the cassette 110 ensuring a smooth transfer of the banknote into the cassette 110.

The cassette 110, as can best be seen in FIG. 6, comprises a case having a door 110a, a rear wall 110b, side walls 110c, 110d, a lid 400 and a base 110e. The door [11a] *110a* is hinged along one of its edges to one of the side walls 110c. One 110d of the side walls has also a handle 401 for ease of handling. The lid 400 is a flat panel having a tab 400' at its free end. The lid 400 is slidably coupled with the top of the cassette 110. The lid 400 and the door 110a are provided with latches (not shown) which are connected to a slide 402 mounted on the side wall 110d provided with the handle [H] *401*. The door 110a, which can be opened so as to unload the banknotes located within the cassette 110, has a mechanical lock 403, in this instance a rotatable barrel operable by means of a key 404. It will be appreciated that the cassette module 50 can also *be* provided with a conventional electronic lock, such as a solenoid assembly (not shown) so as to lock the cassette 110 within the cassette structure 51.

Conveniently, the apparatus 10 is controlled by a conventional main control unit (MCU) or main controller (MC) and a software application designed for use by a cashier in charge of the operation of the apparatus 10. The MCU controls and monitors the operation of the document handling apparatus as explained below as well as others control units located within the apparatus.

When the user [put] *puts* a stack of banknotes in the input module 41, the banknotes are fed one by one into transport for conveying each banknote past detectors 43a to the first diverter 44. If the banknote is to be stored in the storage assembly, the first diverter 44 directs the banknote into the storage assembly 30 via the through safe transport 70 and the transport safe module 80 to the appropriate RSM 31. If the banknote is to be returned to the user, the first diverter 44 directs the banknote to the stacker 46 from which it can be collected by the user.

When a banknote is to be dispensed from a roll storage module 31, it is conveyed in the reverse direction out of the RSM 31 along the transport safe module 80 via the transport safe transport 70 to the first diverter 44 which directs the banknote to the stacker 46 where it can be collected by the user.

With the skimming module 50 according to the present invention, three different skimming modes are available to the user.

Before any skimming mode is available, the user must open the door cover 60 and then insert a cassette 110 within the cassette structure 51. The cassette 110 is locked within the cassette structure 51 and the lid 400 of the cassette 110 must be open. To open the lid 400 the user must press the slide 402 downwards and slide the lid 400 out in direction A (FIG. 6) using tab 400' as a handle. The lid 400 can then be swung down so as to cover the side panel 110d so that access to the interior of the cassette 110 is allowed. The cassette 110 is then lifted up to its skimming position (FIG. 9) by operating the lever 142. When the cassette 110 is moved to this skimming position, the note guides 400b of the structure 51 [is] *are* displaced into the cassette 110. The Main control unit of the apparatus 10 sends a command to the paddle drive mechanism 200 to move upward the packer plate 115 of the cassette 110 until a typical end stop switch detects that the plate 115 has reached its end position and the motor stops.

The MCU continuously checks that the cassette 110 is empty via the signal received from the sensor 210. If the cassette is not empty the sensor 210 will detects the notes and will stop the motor of the paddle drive mechanism before the end stop switch.

If the MCU detects that the cassette 110 is not empty then the user is prompted to enter the value of the notes or documents inside the cassette 110. Alternatively, the cassette may be rejected by the MCU as not being an empty cassette 110. All the transport systems described herein are driven by motors which are controlled by the MCU in a conventional way and will therefore not further be described.

According to a first skimming mode, the user when selecting a withdrawal can also select to send the banknotes to be withdrawn to the cassette 110. In this event, each banknote is conveyed in the reverse direction out of the RSM 31 along the transport safe module 80 via the transport safe transport 70 to the first diverter 44 which directs the banknote to the second diverter 45 which directs the banknote to the skimming transport *path* 90 so that the banknote is stored into the cassette 110. During this operation, a controller controls the paddle drive mechanism 200 to move downward the packer plate 115 of the cassette 110 in such a way that the distance between the last banknote on the packer plate 115 and the sensor 210 is always at the same predetermined distance. When the skimming operation is terminated, the user must lift down the cassette 110 to its release or second position via the lever 142 and then close the lid 400 of the cassette 110 before being able to unlock and remove the cassette 110 from the structure 51.

According to a second skimming mode, if the MCU detects that at least one RSM 31 is almost full and that a cassette 110 is present within the apparatus 10, the user is prompted with a message offering him/her to skim banknotes to the cassette 110. If the user accepts, the MCU will automatically empty the identified RSM 31 by conveying [banknote] *banknotes* in the reverse direction out of the RSM along the transport safe module 80 via the transport safe 70 to the first diverter 44 which directs the banknote to the second diverter 45 which directs the banknote to the skimming transport *path* 90 so that the banknote is stored into the cassette 110. All notes into the cassette 110 are counted. It will be appreciated that for this second mode, the user is able to preset a minimum amount of notes which must be left inside each Roll Storage Modules (RSM) 31. When the skimming operation is terminated, the user must lift down the cassette 110 to its release position via the lever 142 and then close the lid 400 of the cassette before being able to unlock and remove the cassette 110 from the structure 51.

In the event that more than one RSM [need] *needs* to be emptied within the same cassette 110, the MCU commands the RSM 31 containing the biggest notes to be conveyed first to the cassette 110 avoiding hence any stacking problems inside the cassette 110.

It will be appreciated that in order to improve the traceability of the person requiring a skimming operation, the software controlling the apparatus 10 is set up in such a way that security means are put in place, for instance, name and password are required before any skimming modes can start. In addition, before a user is able to remove a cassette 110 from the structure 51, the user can be prompted to print out a "skimming closure report" reporting the content of the cassette 110. Such a report is also available in the event that a jam occurred during the skimming operation.

According to a third skimming mode, it is possible to set up the apparatus to move straight into the cassette predefined banknotes, such as specific denomination, notes qualities during normal deposit operations. In this last mode, it will not be possible to execute within the same cassette 110 the two previous skimming modes above described. The user will be prompted to replace the cassette 110 if the first or second skimming mode is available.

For all of the skimming modes, the skimming process is stopped automatically when there are no more banknotes to be skimmed or when the cassette 110 is detected full by the sensor 210, i.e. the sensor 210 detects that the packer plate 115 has reached the low end position. Alternatively, the value inside the cassette 110 may be preset so that any skimming operation stops when the value inside the cassette 110 reaches this preset limit.

The document handling apparatus 10 equipped with a skimming cassette module 50 as herein described has the advantages of offering a means for conveniently removing surplus documents or banknotes out of the safe to another area in a bundled and shielded way and this without opening the safe or touching the documents.

The invention claimed is:

1. A document handling apparatus comprising*:* a safe*,* housing[;] a storage assembly;

a note handling module (*NHM*) mounted on top of the safe, the note handling module having an input module, an NHM transport for conveying documents, an output module, a document analysis assembly and a first diverter*,* controlled by a main control unit;

a cassette [module] *structure which is sized to accommodate a removable cassette for storing documents*; and a door cover which conceals a safe door providing access to the interior of the safe, wherein the door cover further conceals the cassette [module] *structure* which is located between the door cover and the safe door [and which houses a removable cassette for storing documents], wherein the NHM transport and the first diverter are configured to dispense documents earlier stored in the storage assembly at least to the cassette.

2. An apparatus as claimed in claim 1, wherein the cassette [module] *structure* is mounted on the safe door by a secure hinge arrangement.

3. An apparatus as claimed in claim 1, [wherein] *further comprising, mounted at the upper part of* the cassette [module comprises] *structure,* a vertical transport section which in use is associated with a horizontal transport section located in the note handling module, the vertical and horizontal section forming together a skimming transport path.

4. An apparatus as claimed in claim 3, wherein the output module comprises stacker wheels and [in that] the horizontal transport section is located underneath the [said] stacker wheels.

5. An apparatus as claimed in claim 1, wherein the note handling module comprises a second diverter which when in a first position enables documents to be fed to the output module, and which when in a second position enables documents either earlier stored in the storage assembly or placed in the input module to be dispensed[, in use,] to the cassette in response respectively to a command entered from a user or to the detection via the document analysis assembly of pre-defined banknotes.

6. An apparatus as claimed in claim 5, wherein the second diverter is located at a leading edge of the horizontal transport section.

7. An apparatus as claimed in claim 1, [wherein the cassette module comprises] *further comprising, attached to the cassette structure,* a paddle drive mechanism arranged, in use, to drive up and down along the length of the cassette a packer plate located inside the cassette and a note stack level control for determining and controlling, in use, the position of the packer plate.

8. An apparatus as claimed in claim 1, wherein the cassette [module] *structure* further comprises a lift mechanism which when in a first position enables a cassette to be loaded or unloaded from the cassette [module] *structure*, and which when in a second position enables documents to be fed to the cassette.

9. An apparatus as claimed in claim 1, wherein the cassette [module] *structure* comprises a pivotally mounted note guide arranged in such a way that when the cassette is in a pre-defined position, the note [guides reach] *guide reaches* into the cassette.

10. An apparatus as claimed in claim [1] *3*, [further comprising a vertical trans ort section] wherein the vertical transport section has a trailing edge which is provided with a pair of flapper wheels.

11. An apparatus as claimed in claim 1, wherein the storage assembly consists of a number of roll storage modules in which documents can be stored.

12. A method of outputting documents in bulk to a removable cassette [having a packer plate located inside the cassette and] using a document handling apparatus which is controlled by a main control unit (*MCU*), *the method* comprising:

*opening a door cover, wherein the door cover conceals a safe door that provides access to the interior of a safe located in the document handling apparatus, and wherein the door cover further conceals a cassette structure which is located between the door cover and the safe door;* inserting and locking the cassette within [a] *the* cassette [module, wherein the document handling comprises a door cover which conceals a safe door providing access to the interior of a safe, and wherein the door cover further conceals the cassette module which is located between the door cover and the safe door] *structure*;

controlling [an NHM] *a note handling module* transport [and], a skimming transport [of the apparatus] *path*, a first diverter, and a second diverter in such a way that documents earlier stored in a storage assembly *in the safe* are dispensed at least to the cassette in response to a command entered from a user *and* sent to [an] *the* MCU, wherein the storage assembly is configured to receive documents from an input module.

13. A method as claimed in claim 12, wherein the command entered from a user is either a confirmation command entered in response to the detection that the capacity of a storage module *in the storage assembly* is reaching its limit or a withdrawal command to dispense the document within the cassette.

14. A method as claimed in claim 12, wherein upon detection that the cassette is full or has reached a pre-determined value defined by the user, a command to stop dispensing documents to the cassette is sent to the MCU.

15. A document handling apparatus controlled by a main control unit for outputting documents in bulk to a removable cassette [having a packer plate located inside the cassette], wherein the apparatus is configured to allow the cassette to be inserted and locked within a cassette module, wherein the document handling apparatus comprises a door cover which conceals a safe door providing access to the interior of a safe, and wherein the door cover further conceals the cassette module which is located between the door cover and the safe door, and wherein [a NHM] *a note handling module* transport [and], a skimming transport [of the apparatus] *path*, a first diverter, and a second diverter are configured in such a way that documents earlier stored in a storage assembly *in the safe* are dispensed at least to the cassette in response to a command entered from a user *and* sent to the main control unit, wherein the storage assembly is configured to receive documents from an input module.

16. An apparatus as claimed in claim 15, wherein the command entered from a user is either a confirmation command entered in response to the detection that the capacity of a storage module *in the storage assembly* is reaching its limit or a withdrawal command to dispense the document within the cassette.

17. An apparatus as claimed in claim 15, wherein the apparatus is configured to detect whether the cassette is full or has reached a pre-determined value defined by the user, and if so detected, to send a command to stop dispensing documents to the cassette is sent to the main control unit.

18. A method of outputting documents in bulk to a removable cassette [having a packer plate located inside the cassette and] using a document handling apparatus which is controlled by a main control unit, *the method* comprising:

*opening a door cover, wherein the door cover conceals a safe door that provides access to the interior of a safe located in the document handling apparatus, and wherein the door cover further conceals a cassette structure which is located between the door cover and the safe door;* inserting and locking the cassette within a cassette [module, wherein the document handling apparatus comprises a door cover which conceals a safe door providing access to the interior of a safe, and wherein the door cover further conceals the cassette module which is located between the door cover and the safe door,] *structure;* controlling [an NHM] *a note handling module* transport [and], a skimming transport [of the apparatus] *path*, a first diverter, and a second diverter such that they are capable of dispensing documents earlier stored in a storage assembly *in the safe* at least to the cassette in response to a command entered from a user *and* sent to a main control unit, and dispensing documents placed in an input module at least to the cassette in response to detection of pre-defined documents, wherein the storage assembly is configured to receive documents from the input module.

19. A method as claimed in claim 18, wherein the command entered from a user is either a confirmation command entered in response to the detection that the capacity of a storage module *in the safe* is reaching its limit or a withdrawal command to dispense the document within the cassette.

20. A method as claimed in claim 18, wherein upon detection that the cassette is full or has reached a pre-determined value defined by the user, a command to stop dispensing documents to the cassette is sent to the main control unit.

21. [An] *A* document handling apparatus controlled by a main control unit for outputting documents in bulk to a removable cassette [having a packer plate located inside the cassette], wherein the apparatus is configured to allow the cassette to be inserted and locked within a cassette [module] *structure*, wherein the document handling apparatus comprises a door cover which conceals a safe door providing access to the interior of a safe, and wherein the door cover further conceals the cassette [module] *structure* which is located between the door cover and the safe door, and wherein [an NEM] *a note handling module* transport and a skimming transport *path* of the apparatus, a first diverter and a second diverter are configured in such a way that they are capable of*:* dispensing documents earlier stored in a storage assembly at least to the cassette in response to a command entered from a user sent to [a] *the* main control unit, and dispensing documents placed in an input module at least to the cassette in response to detection of pre-defined documents, wherein the storage assembly is configured to receive documents from the input module.

22. An apparatus as claimed in claim 21, wherein the command entered from a user is either a confirmation command entered in response to the detection that the capacity of a storage module *in the safe* is reaching its limit or a withdrawal command to dispense *one or more of* the [document] *documents* within the cassette.

23. An apparatus as claimed in claim 21, wherein the apparatus is configured to detect whether the cassette is full or has reached a pre-determined value defined by the user, and if so detected, to send a command to stop dispensing documents to the cassette is sent to the main control unit.

24. A document handling apparatus comprising*:* a safe, housing[,] a storage assembly, a note handling module mounted on top of the safe, the note handling module having an input module, [an NHM] *a note handling module* transport for conveying documents, an output module, a document analysis assembly and a first diverter, controlled by a main control unit, a cassette [module] *structure which is sized to accommodate a removable cassette for storing documents*, and a door cover which conceals a safe door providing access to the interior of the safe, wherein the door cover further conceals the cassette [module] *structure* which is located between the door cover and the safe door [and which houses a removable cassette for storing documents], wherein the [NHM] *note handling module* transport and the first diverter are capable of dispensing at least one of: i) documents earlier stored in the storage assembly, and ii) documents placed in the input module, at least to the cassette.

*25. The document handling apparatus of claim 1, wherein the documents are banknotes.*

*26. The document handling apparatus of claim 15, wherein the documents are banknotes.*

*27. The document handling apparatus of claim 21, wherein the documents are banknotes.*

*28. The document handling apparatus of claim 24, wherein the documents are banknotes.*

*29. The method of claim 15, wherein the documents are banknotes.*

*30. The method of claim 18, wherein the documents are banknotes.*

*31. A method of outputting documents in bulk to a removable cassette, using a document handling apparatus which is controlled by a main control unit, the method comprising:*

*introducing documents into an input module of a note handling module, or a storage assembly housed in a safe,*

*wherein the note handling module is mounted on top of the safe, and additionally has an output module, and a document analysis assembly, and wherein a door cover conceals a safe door that provides access to the interior of the safe, and further conceals the cassette structure which is located between the door cover and the safe door;*

*conveying the documents via a note handling module transport of the note handling module; and*

*routing the documents, via a first diverter in the note handling module, to a cassette removably located in a cassette structure.*

* * * * *